US009694716B2

(12) United States Patent
Masuda

(10) Patent No.: US 9,694,716 B2
(45) Date of Patent: Jul. 4, 2017

(54) VEHICLE SEAT

(71) Applicant: TOYOTA BOSHOKU KABUSHIKI KAISHA, Aichi-ken (JP)

(72) Inventor: Hideo Masuda, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/217,234

(22) Filed: Jul. 22, 2016

(65) Prior Publication Data

US 2017/0028875 A1    Feb. 2, 2017

(30) Foreign Application Priority Data

Jul. 31, 2015 (JP) ................................. 2015-151688

(51) Int. Cl.
| | |
|---|---|
| *B60N 2/02* | (2006.01) |
| *B60N 2/56* | (2006.01) |
| *B60N 2/62* | (2006.01) |

(52) U.S. Cl.
CPC ............. *B60N 2/02* (2013.01); *B60N 2/565* (2013.01); *B60N 2/62* (2013.01)

(58) Field of Classification Search
CPC ............. B60N 2/02; B60N 2/565; B60N 2/62
USPC .................................................... 297/180.14
See application file for complete search history.

(56) References Cited

U.S. PATENT DOCUMENTS

| | | | | | |
|---|---|---|---|---|---|
| 6,048,024 | A  | * | 4/2000 | Wallman | A47C 7/74 297/180.14 |
| 7,261,372 | B2 | * | 8/2007 | Aoki | B60N 2/5635 297/180.14 |
| 8,998,311 | B2 | * | 4/2015 | Axakov | B60N 2/5635 297/180.14 |

FOREIGN PATENT DOCUMENTS

| | | | | |
|---|---|---|---|---|
| JP | 2013-126789 | | 6/2013 | |
| JP | 2015067151 | A * | 4/2015 | ............. B60N 2/565 |

* cited by examiner

*Primary Examiner* — Anthony D Barfield
(74) *Attorney, Agent, or Firm* — Greenblum & Bernstein, P.L.C.

(57) ABSTRACT

A vehicle seat includes: a front tilt mechanism including a front panel that is bridged between left and right side frames of a seat cushion and connected with the left and right side frames at connection points, the front panel being configured to pivot about the connection points in a height direction to adjust an angle of a seating surface of a front portion of the seat cushion; and an air conditioner mounted to the seat cushion, the air conditioner including: a slide mechanism that allows to change a distance between a front pivot-mounting part and a rear pivot-mounting part with a slide movement, wherein the air conditioner is bridged between the lower surface of the front panel and the cylindrical pipe and configured to allow the front panel of the front tilt mechanism to pivot about the connection points with a slide movement of the slide mechanism.

4 Claims, 9 Drawing Sheets

VEHICLE SEAT

CROSS-REFERENCE TO RELATED APPLICATION

This application claims priorities from Japanese Patent Application No. 2015-151688 filed on Jul. 31, 2015, the entire subject matters of which is incorporated herein by reference.

TECHNICAL FIELD

The present invention relates to a vehicle seat. More particularly, the present invention relates to a vehicle seat which includes a front tilt mechanism capable of adjusting the angle of a seating surface of a front portion of a seat cushion, and an air conditioner mounted to the seat cushion.

BACKGROUND

In the related art, a vehicle seat with an air conditioner provided in a seat cushion is generally known (see, for example, JP-A-2013-126789). The air conditioner is coupled to a support spring that supports a cushion pad upward, and is configured to supply air upward into a ventilation passage formed in the cushion pad. The support spring is integrally installed within a range of the cushion frame and configured to support the cushion pad upward at a correct position.

However, according to the related art, in the case where the seat cushion is provided with a front tilt mechanism capable of adjusting the angle of a seating surface of a front portion of the seat cushion, it is impossible for the air conditioner mounted to the support spring to appropriately follow the movement of the cushion pad that is moved upward or downward to adjust the angle of the seating surface.

SUMMARY

The present disclosure is made in consideration of the above-mentioned circumstances, and one of objects of the present disclosure is to provide a vehicle seat having an air conditioner installed in a configuration capable of appropriately following the operation of a front tilt mechanism.

According to an illustrative embodiment of the present disclosure, there is provided a vehicle seat including: a front tilt mechanism that includes a front panel that is bridged between left and right side frames of a seat cushion and connected with the left and right side frames at connection points, the front panel being configured to pivot about the connection points in a height direction to adjust an angle of a seating surface of a front portion of the seat cushion; and an air conditioner that is mounted to the seat cushion, the air conditioner including: a front pivot-mounting part that is pivotally mounted to a lower surface of the front panel; a rear pivot-mounting part that is pivotally mounted to a cylindrical pipe that is bridged between the left and right side frames; and a slide mechanism that allows to change a distance between the front pivot-mounting part and the rear pivot-mounting part with a slide movement, wherein the air conditioner is bridged between the lower surface of the front panel and the cylindrical pipe and configured to allow the front panel of the front tilt mechanism to pivot about the connection points with the slide movement of the slide mechanism.

DETAILED DESCRIPTION

Hereinafter, an illustrative embodiment of the present disclosure will be described with reference to the accompanying drawings.

Figure 1:
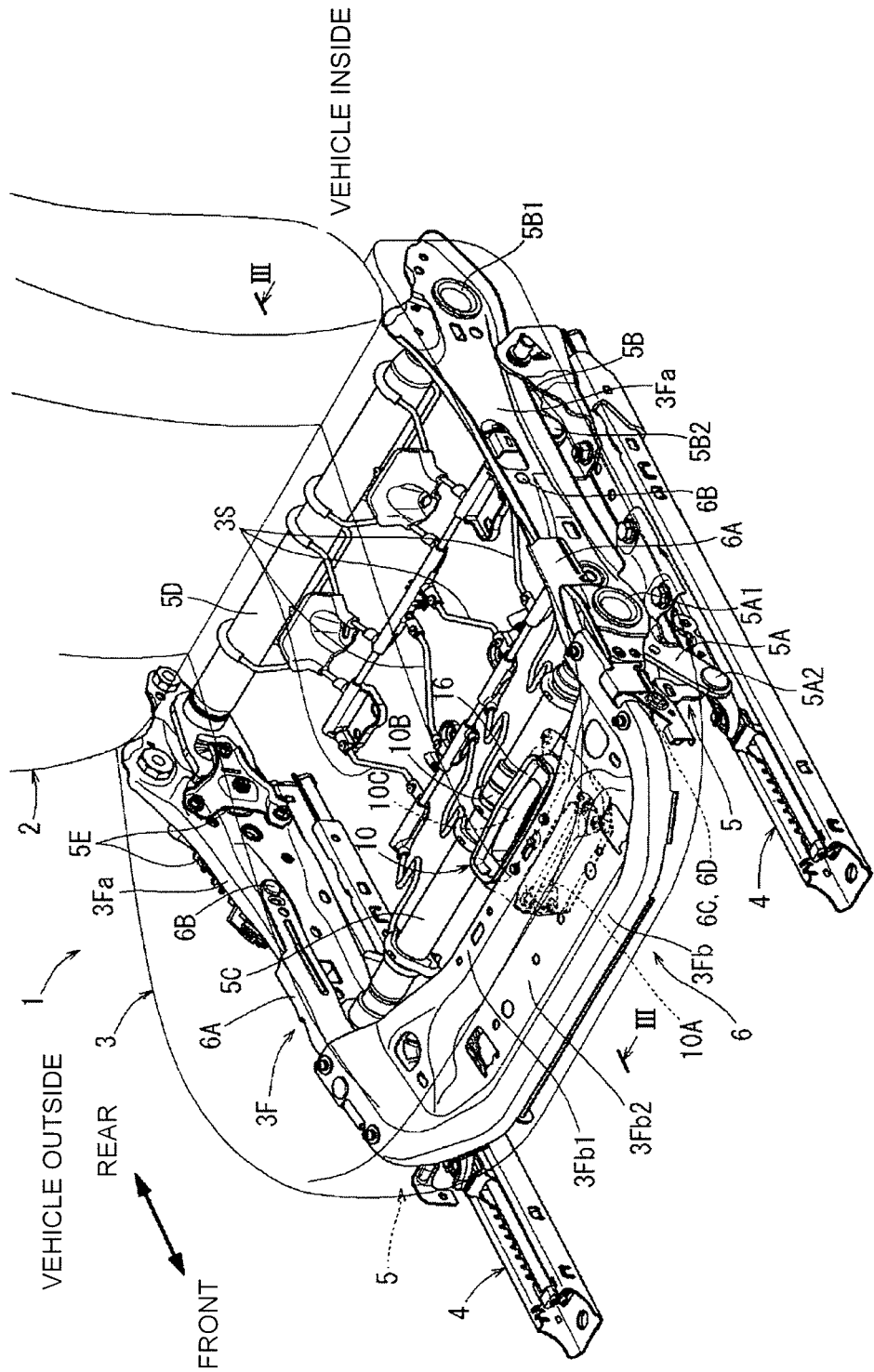
FIG. 1 is a perspective view illustrating the schematic configuration of a vehicle seat according to an embodiment of the present disclosure.

The configuration of a seat 1 (a vehicle seat) according to an embodiment of the present disclosure will be described with reference to FIGS. 1 to 9. As illustrated in FIG. 1, the seat 1 according to the embodiment is configured as a passenger seat of an automobile, and includes a seat back 2 which functions as a back support for an occupant who is sitting on the seat 1, and a seat cushion 3 which functions as a seating part. The seat I has the configuration of a so-called "powered seat" and is configured such that adjustment of a back support angle of the seat back 2 and adjustment of a seating position of the seat cushion 3 are embodied in a motor-operated manner by manipulating respective switches.

In detail, the seat back 2 is configured such that lower ends of opposite left and right sides thereof are respectively coupled to rear ends of opposite left and right sides of the seat cushion 3 with electric reclining devices (not illustrated) interposed therebetween. Thereby, the seat back 2 is configured such that, in normal state, the back support angle thereof is maintained in a fixed state by the reclining devices, and, when the reclining devices are electrically operated by manipulating a switch (not illustrated), the back support angle is adjusted forward or backward.

The seat cushion 3 is coupled to a floor of the vehicle with a pair of left and right electric slide rails 4 interposed therebetween. Thus, the seat cushion 3 is configured such that, in normal state, the seating position thereof is maintained in a fixed state by the above-mentioned slide rails 4, and, when the slide rails 4 are electrically operated by manipulating a switch (not illustrated), the seating position thereof is adjusted forward or backward.

The seat cushion 3 is configured with electric seat lifters 5 interposed between the seat cushion 3 and the respective left and right slide rails 4. Thereby, the seat cushion 3 is configured such that, in normal state, a seating height thereof is maintained in a fixed state by the seat lifters 5, and, when the seat lifters 5 are electrically operated by manipulating a switch (not illustrated), the seating height thereof is adjusted.

The seat cushion 3 is provided with an electric front tilt mechanism 6 on a front portion thereof. Thereby, the seat cushion 3 is configured such that, in normal state, a support angle of the front portion which supports the femoral parts of the occupant is maintained in a fixed state by the above-mentioned front tilt mechanism 6, and, when the front tilt mechanism 6 is electrically operated by manipulating a switch (not illustrated), the support angle of the front portion of the seat cushion 3 is adjusted in the height direction.

As such, the seat 1 is configured to realize an eight-way adjustment structure including the adjustment of the back support angle of the seat back 2 (front-and-rear two directions), the adjustment of the seating position of the seat cushion 3 (front-and-rear two directions and up-and-down two directions), and the adjustment of the support angle of the front portion of the seat cushion 3 (up-and-down two directions). These adjustment operations are embodied in a motor-operated manner by manipulating the switches (not illustrated) which are provided at a position, for example, on a side of the seat cushion 3 that faces the outside (the left side on the drawing) of the vehicle.

The seat 1 further includes a suction type air conditioner 10 which is provided at a position in the front portion of the seat cushion 3 that supports the femoral parts of the occupant. The air conditioner 10 performs ventilation for preventing stagnation of sweat on the occupant who is sitting on the seat cushion 3. The air conditioner 10 is provided under a lower surface of a front panel 3Fb of the seat cushion 3 that is moved upward or downward by the operation of the front tilt mechanism 6. In detail, to avoid interference with an after-mentioned concave part 3Fb2 which is formed in the front panel 3Fb, the air conditioner 10 is provided in the form of spanning between an inclined support part 3Fb1, which extends in a downwardly inclined direction behind the concave part 3Fb2 of the front panel 3Fb, and a front pipe 5C, which is bridged between opposite side frames 3Fa of the seat cushion 3 that is disposed behind the air conditioner 10.

The air conditioner 10 is configured to span between the front panel 3Fb and the front pipe 5C. In addition, the air conditioner 10 is configured such that an angle or distance, at which the air conditioner 10 spans between the front panel 3Fb and the front pipe 5C, varies when the front panel 3Fb is moved upward or downward by the operation of the front tilt mechanism 6. The reason for this is because the front panel 3Fb is moved upward or downward around rotating shafts 6B installed at a position behind the front pipe 5C.

Although, as described above, the air conditioner 10 spans between the front panel 3Fb and the front pipe SC while allowing variation in angle or distance at which the air conditioner 10 spans therebetween, the air conditioner 10 can be coupled to the front panel 3Fb and the front pipe 5C such that it is maintained in a state of being appropriately interlocked therewith without impeding the upward or downward movement of the front panel 3Fb. Hereinafter, detailed descriptions of the structure of coupling the air conditioner 10 to the front panel 3Fb and the front pipe SC will be made along with the detailed configuration of the seat cushion 3.

The configuration of the seat cushion 3 will be described. The seat cushion 3 includes a cushion frame 3F which is made of metal and forms a framework of the seat cushion 3. When viewed in the plan view, the cushion frame 3F is configured in the form of a rectangular frame corresponding to the peripheral shape of the seat cushion 3. In detail, the cushion frame 3F includes a pair of left and right side frames 3Fa, and a front panel 3Fb which is bridged between respective front ends of the side frames 3Fa and supports the femoral parts of the occupant upward. The front pipe 5C and a rear pipe 5D, each of which is made of a cylindrical metal pipe, are respectively bridged in the lateral direction of the seat between the front portions of the side frames 3Fa and between rear portions thereof. Thus, in the plan view, the cushion frame 3F has a rectangular frame shape. Support springs 3S span between the front pipe 5C and the rear pipe 5D, at four positions with respect to the lateral direction of the seat. The support springs 3S elastically and smoothly support upward a cushion pad (not illustrated) that is mounted on the cushion frame 3F. In this regard, the front pipe 5C corresponds to a "cylindrical pipe" according to the present invention.

Each of the above-mentioned side frames 3Fa is made of a single sheet of steel formed by press-cutting to have a plate shape extending in the front-rear direction. Each side frame 3Fa is installed to be placed on its edge such that both surfaces thereof are oriented in the lateral direction of the seat. Further, each of the upper and lower edges of the side frame 3Fa is bent toward the outside of the seat, thus enhancing the structural strength against bending or torsion.

The front panel 3Fb is made of a single sheet of steel formed by press-cutting to have a plate shape extending a length thereof in the lateral direction of the seat. The front panel 3Fb is set to span between upper portions of the front ends of the respective side frames 3Fa such that both surfaces of the front panel 3Fb are oriented in the height direction. The front panel 3Fb is provided with tilt arms 6A that extend rearward from respective opposite left and right edges of the front panel 3Fb. The tilt arms 6A are disposed inside the respective side frames 3Fa and are rotatably coupled to the respective rotating shafts 6B that are disposed at coaxial positions and oriented in the lateral direction of the seat. Thereby, the front panel 3Fb is configured such that the angle of the upper surface thereof that supports the femoral parts of the occupant is changed by rotating the front panel 3Fb around the rotating shafts 6B in the height direction. The rotating shafts 6B are disposed behind and slightly over the front pipe 5C (see FIG. 3).

As illustrated in FIG. 1, a front edge or each of the opposite left and right edges of the front panel 3Fb is bent downward so as to enhance the structural strength against bending or torsion, and has a round shape rather than having a sharp edged shape on the periphery of the front panel 3Fb. The front panel 3Fb has the inclined support part 3Fb1 that is inclined rearward and downward from a central rear portion of the front panel 3Fb. Due to the inclined support part 3Fb1, the front panel 3Fb can support the front portions of the femoral parts of the occupant upward, thus enhancing the seating comfort. Furthermore, the concave part 3Fb2 is formed in a central front portion of the upper surface of the front panel 3Fb. The concave part 3Fb2 functions to receive an airbag unit (not illustrated) that is provided to be deployed when the vehicle is involved in a head-on collision, so as to prevent a so-called submarine phenomenon in which the occupant slips on the seat due to an impact and rushes into space under the dashboard.

The seat lifter 5 is configured of a pair of left and right four-link mechanisms including a pair of left and right front links SA, a pair of left and right rear links 5B, and a drive unit 5E which transmits rotating force or braking force to the rear link 5B corresponding to the outside of the vehicle to embody upward or downward movement.

The front links 5A are disposed at left and right asymmetrically offset positions toward the outside of the vehicle with respect to the respective side frames 3Fa. Each front link 5A is rotatably coupled at an upper end thereof to the corresponding side frame 3Fa with a cylindrical bushing 5A1 interposed therebetween. A lower end of each front link 5A is rotatably coupled to a corresponding slide rail 4 with a connection shaft 5A2 interposed therebetween. Between the bushing 5A1, diameter-reduced stepped opposite ends of the front pipe 5C having a cylindrical shape are inserted into the respective cylindrical bodies of the bushings 5A1 in the lateral direction of the seat and are rotatably coupled thereto.

The rear links 5B are also disposed at left and right asymmetrically offset positions toward the outside of the vehicle with respect to the respective side frames 3Fa. Each rear link 5B is rotatably coupled at an upper end thereof to the corresponding side frame 3Fa with a cylindrical bushing 5B1 interposed therebetween. A lower end of each front link 5B is rotatably coupled to a corresponding slide rail 4 with a connection shaft 5B2 interposed therebetween. Between the bushing 5B1, diameter-reduced stepped opposite ends of the rear pipe 5D having a cylindrical shape are fitted into the respective cylindrical bodies of the bushings 5B1 in the lateral direction of the seat and are integrally coupled thereto. Due to this installation structure, the rear links 5B can be integrally rotated around the rear pipe 5D interposed therebetween, whereby the structural strength thereof against bending or torsion can be enhanced.

The rear link 5B that is disposed adjacent to the outside of the vehicle is coupled with the drive unit 5E for transmitting rotating force or braking force to the same rear link 5B. The drive unit 5E is attached to the side frame 3Fa corresponding to the outside of the vehicle. To transmit the rotating force or braking force to the rear link 5B provided at the corresponding side, the drive unit 5E has a structure engaging with a pinion gear (not illustrated) and a sector gear (not illustrated) for making power transmission possible.

With regard to the seat lifter 5, when the drive unit 5E is operated by manipulating the corresponding switch (not illustrated), the rotating force is transmitted to the rear link 5B that is adjacent to the outside of the vehicle, whereby the rear links 5B and the front links 5A that are disposed at the opposite sides are simultaneously moved upward or downward. In the seat lifter 5, when the corresponding switch (not illustrated) is not manipulated, the rear links 5B and the front links 5A that are disposed at the respective opposite sides are simultaneously maintained in the fixed state by the braking force exerted from the drive unit 5E.

The front tilt mechanism 6 includes the tilt arms 6A, the rotating shafts 6B, a pair of bending-and-extending links 6D, and a drive unit 6C. The tilt arms 6A are respectively coupled to the opposite left and right portions of the front panel 3Fb and extend rearward. The rotating shafts 6B respectively rotatably couple the rear ends of the tilt arms 6A to the respective side frames 3Fa. The bending-and-extending links 6D are linked between the front panel 3Fb and the front pipe 5C. The drive unit 6C transmits rotating force or braking force for bending or extending movement to the bending-and-extending link 6D corresponding to the inside of the vehicle.

Although not illustrated in detail, the front pipe 5C is inserted into respective proximal ends of the bending-and-extending links 6D, and thus the bending-and-extending links 6D are provided with the front pipe 5C interposed therebetween so as to be integrally rotatable. The drive unit 6C is mounted to the side frame 3Fa corresponding to the inside of the vehicle and is coupled to the bending-and-extending link 6D disposed at the same side, so as to transmit rotating force or braking force thereto.

Figure 3:
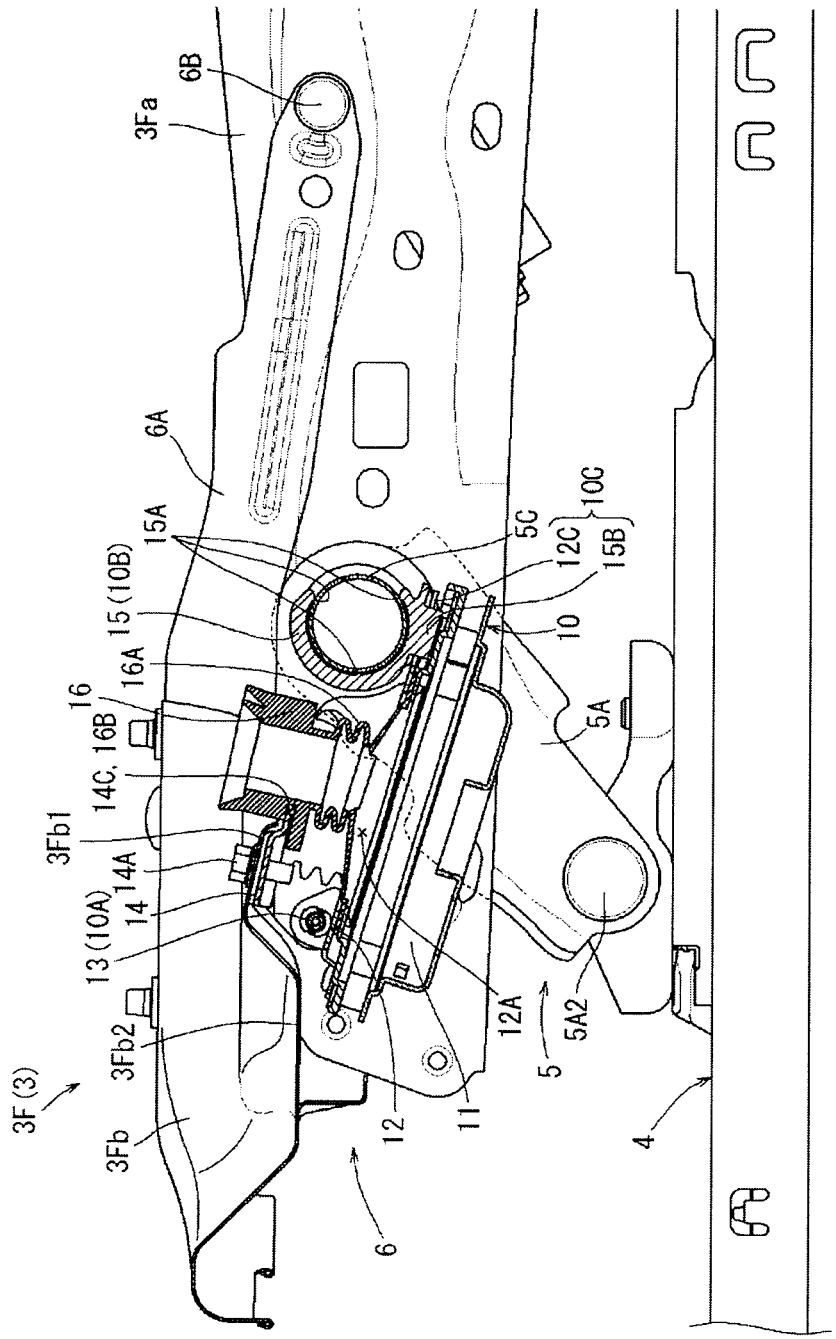
FIG. 3 is a sectional view taken along line III-III of FIG. 1 to illustrate a tilt down state of a seat cushion.

In the front tilt mechanism 6, when the drive unit 6C is operated by manipulating the corresponding switch (not illustrated), the rotating force is transmitted to the bending-and-extending link 6D corresponding to the inside of the vehicle, whereby the opposite bending-and-extending links 6D simultaneously bend or extend. As illustrated in FIG. 3, when the bending-and-extending links 6D extend, the front tilt mechanism 6 perform an upward movement operation (hereinafter, referred to as a "tilt-up operation") of lifting the front panel 3Fb upward around the rotating shafts 6B in such a way that the front panel 3Fb moves away from the front pipe 5C.

Figure 4:
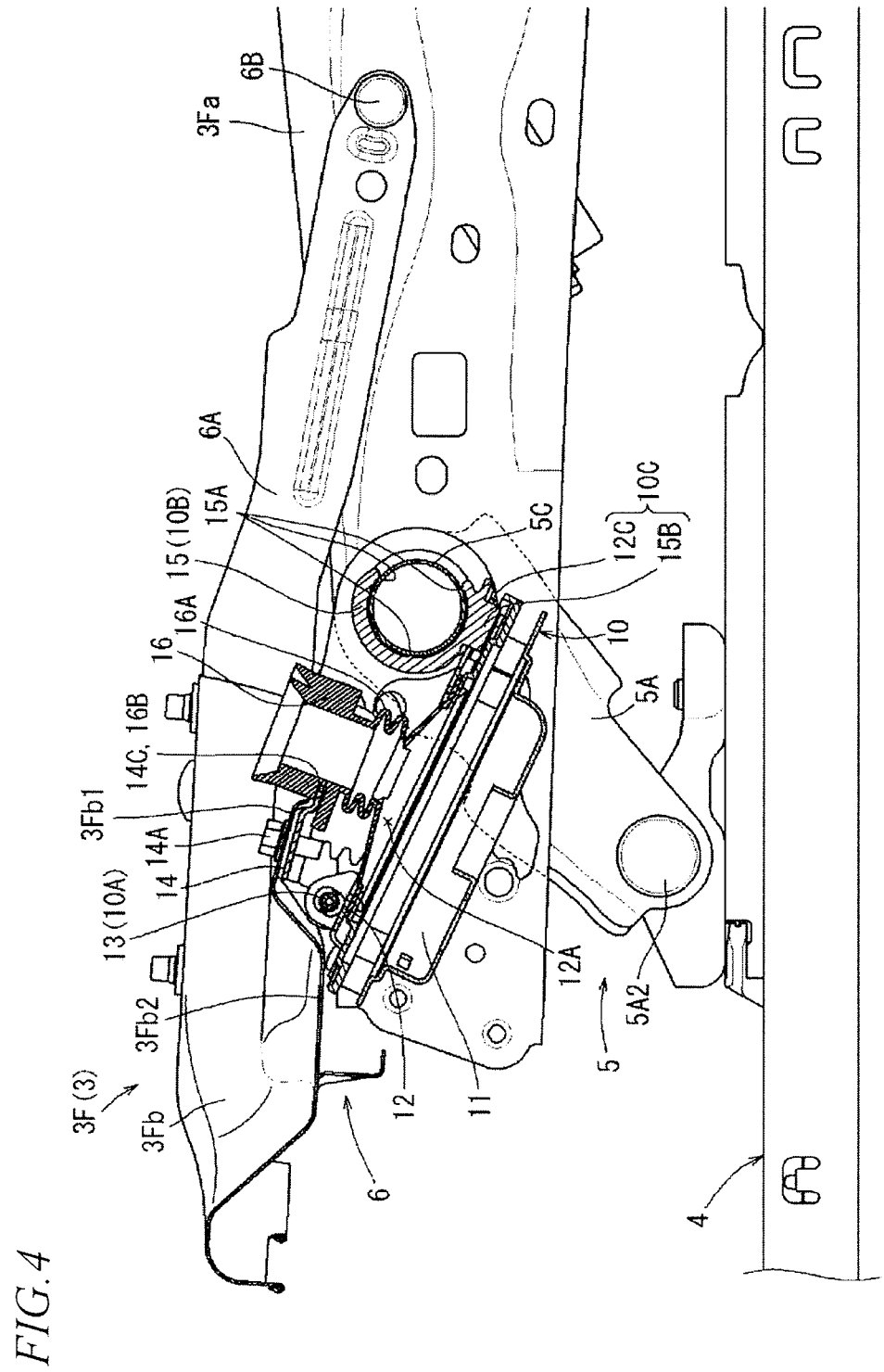
FIG. 4 is a sectional view taken along the same line as that of FIG. 3 to illustrate a tilt up state of the seat cushion.

Furthermore, as illustrated in FIG. 4, when the bending-and-extending links 6D bend, the front tilt mechanism 6 perform a downward movement operation (hereinafter, referred to as a "tilt-down operation") of drawing the front panel 3Fb downward in such a way that the front panel 3Fb approaches the front pipe 5C. With regard to the front tilt mechanism 6, when the corresponding switch (not illustrated) is not manipulated, the bending-and-extending links 6D disposed at the respective opposite sides are simultaneously maintained in the fixed state by the braking force exerted from the drive unit 6C.

cushion pad (not illustrated) made of foamed urethane is installed on the cushion frame 3F to elastically and smoothly absorb the load of the occupant. The entire surface of the cushion pad is covered with a cushion cover (not illustrated) made of fabric. Front, rear, left and right peripheral portions of the cushion cover are pulled downward and fastened to the cushion frame 3F, whereby the cushion pad is maintained in a state in which it is fixed to the upper portion of the cushion frame 3F.

Figure 6:
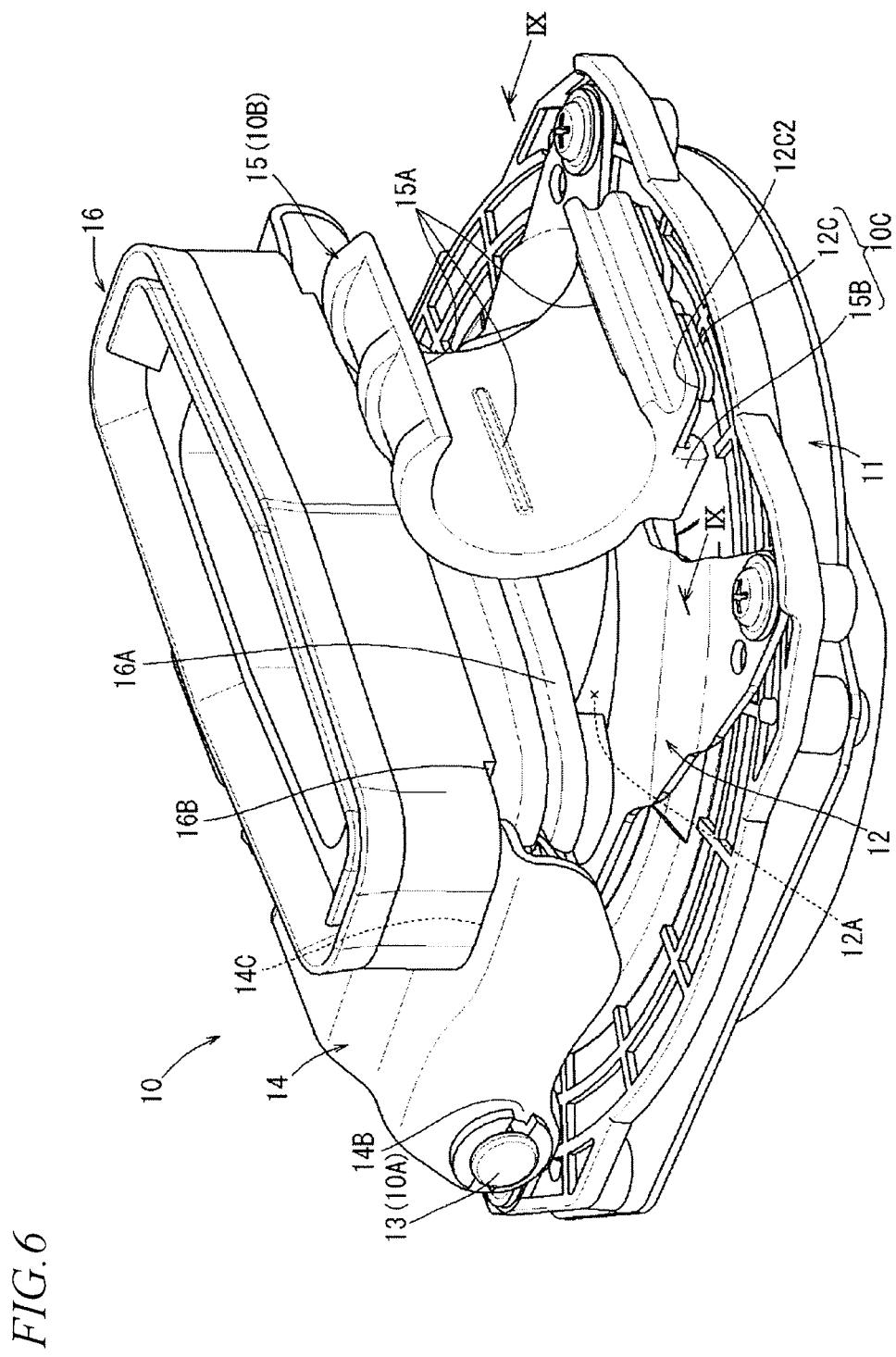
FIG. 6 is a rear perspective view of the air conditioner.
Figure 7:
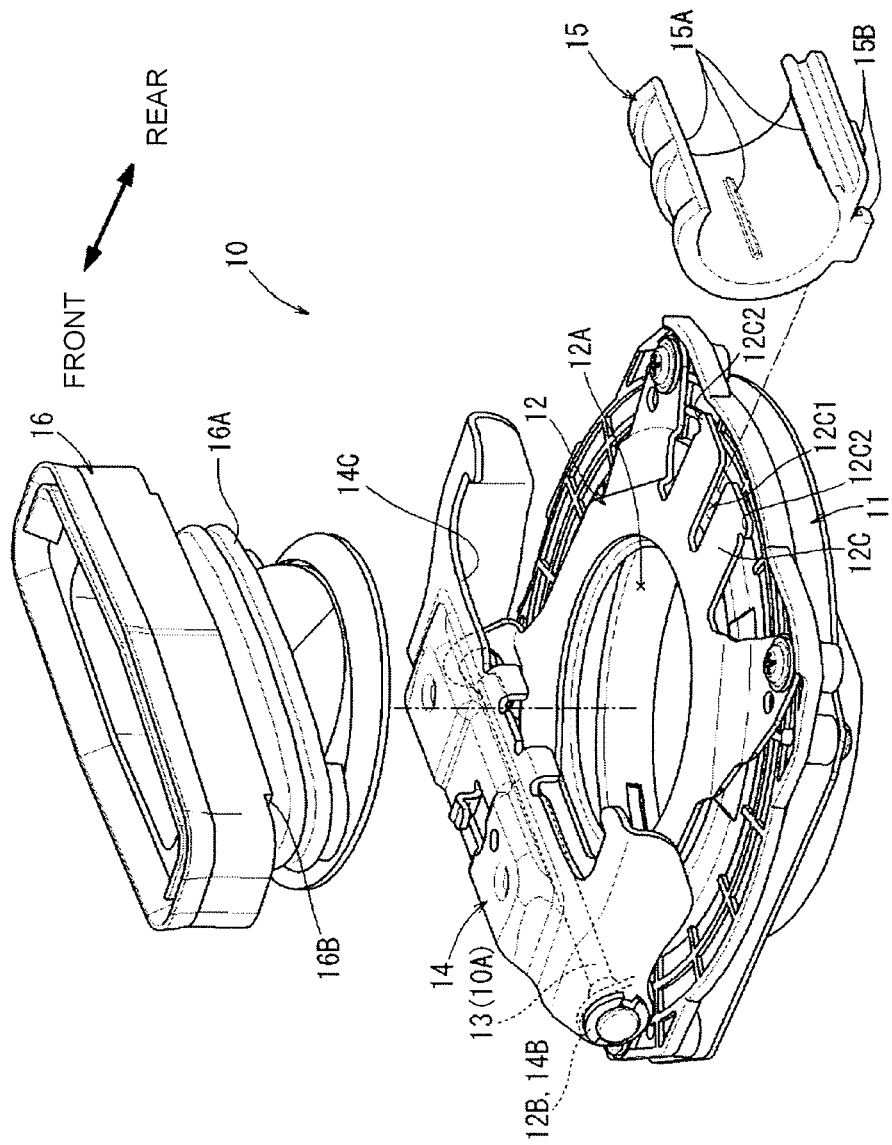
FIG. 7 is an exploded perspective view of the air conditioner of FIG. 6 from which a hook and a duck have been removed.

As illustrated in FIGS. 2 to 5, the air conditioner 10 is bridged between the front panel 3Fb that is moved upward or downward by the operation of the front tilt mechanism 6, and the front pipe 5C that does not follow the upward or downward movement of the front panel 3Fb. In detail, as illustrated in FIGS. 6 and 7, the air conditioner 10 includes a ventilator 11, a mounting plate 12, a mounting bracket 14, a hook and a duct 16. The mounting plate 12 is made of metal and is coupled to an upper surface of the ventilator 11. The mounting bracket 14 is made of metal and is rotatably mounted to a front end of the mounting plate 12 by a shaft pin 13. The hook 15 is made of metal and is mounted to a rear end of the mounting plate 12 so as to be slidable forward and rearward. The duct 16 is made of rubber and is connected to an air inlet port formed in the upper surface of the ventilator 11. In this regard, the hook 15 corresponds to a "first side member" of the present invention, and the mounting plate 12 corresponds to a "second side member" of the present invention.

As illustrated in FIG. 7, the mounting plate 12 is formed by press-cutting a single sheet of metal. Four corners of the mounting plate 12 are fastened to the upper surface of the ventilator 11 by screws, whereby the mounting plate 12 is integrally coupled to the ventilator 11. A circular hole 12A is formed in a central portion of the mounting plate 12 to open an upper portion thereof at a position displaced from the air inlet port formed in the upper surface of the ventilator 11.

Figure 2:
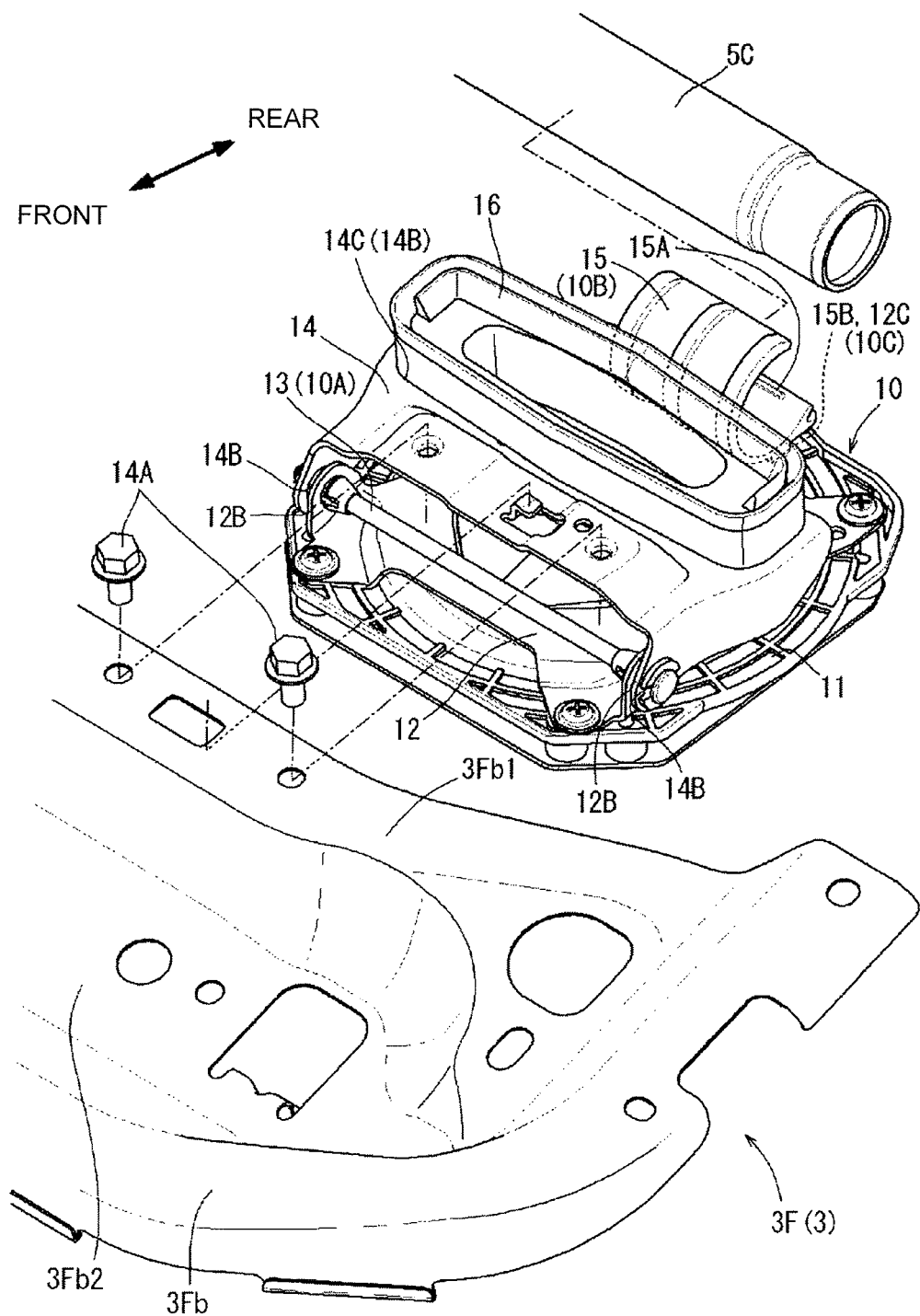
FIG. 2 is an exploded perspective view illustrating a mounting portion for an air conditioner.

The mounting bracket 14 is formed by press-cutting a single sheet of metal. As illustrated in FIGS. 2 and 3, the mounting bracket 14 is integrally fastened to a lower surface of the inclined support part 3Fb1 of the front panel 3Fb by two fastening bolts 14A. As illustrated in FIG. 2, the mounting bracket 14 includes shaft support pieces 14B which are bent downward from left and right opposite ends thereof. The shaft support pieces 14B are set to come into contact with respective outer surfaces of shaft support pieces 12B bent upward from left and right opposite ends of a front end of the mounting plate 12. A shaft pin 13 passes through the shaft support pieces 14B and 12B in the lateral direction of the seat so that the mounting bracket 14 is rotatably mounted to the mounting plate 12 around the shaft pin 13. Due to the structure of rotatably coupling the mounting bracket 14 to the mounting plate 12 with the shaft pin 13 interposed therebetween, a front pivot-mounting part 10A capable of rotatably pivot-mounting the air conditioner 10 to the lower surface of the front panel 3Fb can be embodied.

As illustrated in FIGS. 6 and 7, a retaining part 14C protruding in a C shape is formed in a rear end of the mounting bracket 14. A narrowed part 16B is formed on a medial portion of a passage body of the duct 16, which will be described later herein. The narrowed part 16B is fitted into the retaining part 14C from the read end of the mounting bracket 14 and thus can be retained in the retaining part 14C. As illustrated in FIGS. 3 and 4, in a state in which the mounting bracket 14 is mounted to the lower surface of the front panel 3Fb by bolting, the retaining part 14C is provided to protrude rearward from the front panel 3Fb. Because the narrowed part 16B of the duct 16 is fitted into and retained in the retaining part 14C, an opening formed in an upper end of the duct 16 can be maintained to be oriented in the constant direction relative to the front panel 3Fb. Due to the maintaining structure, even when the front portion of the seat cushion 3 is moved upward or downward by the operation of the front tilt mechanism 6, the opening of the duct 16 can be maintained in a state of being coupled to a connector for an air distribution hole formed in a lower surface of the cushion pad (not illustrated) that follows the upward or downward movement of the seat cushion 3.

Figure 8:
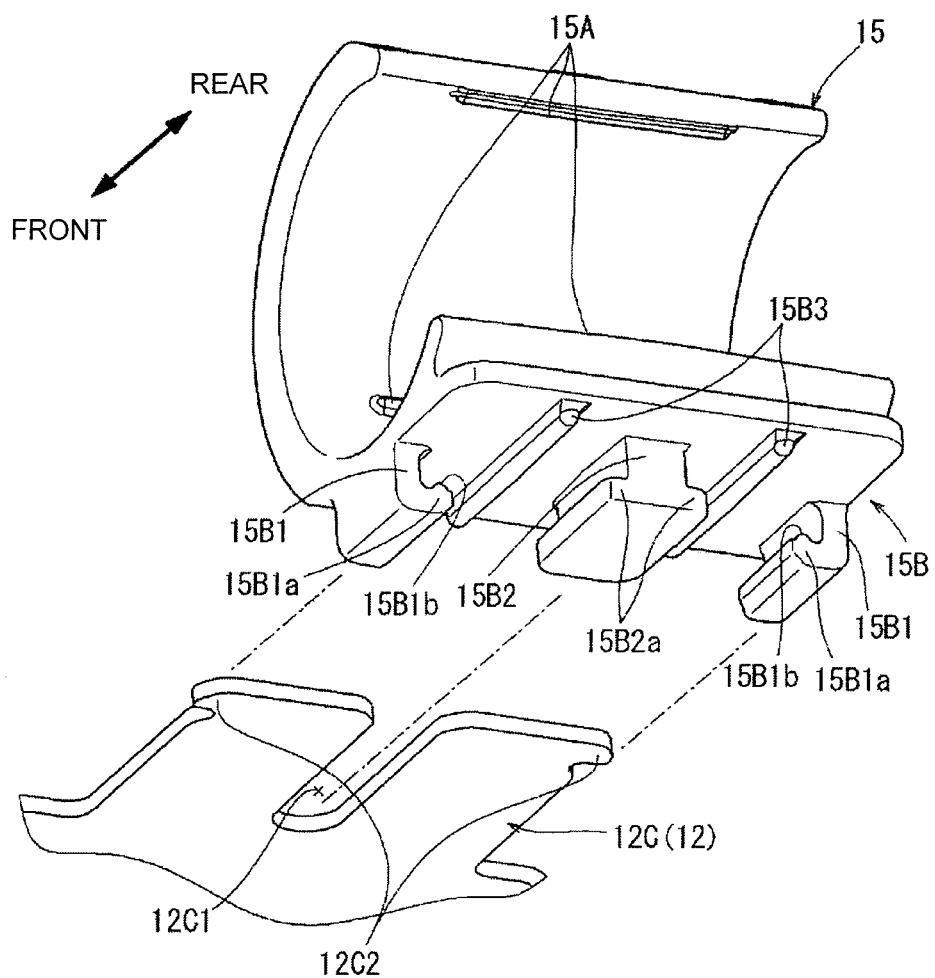
FIG. 8 is a bottom perspective view of the hook.

As illustrated in FIGS. 6 to 8, the hook 15 is mounted, so as to be slidable forward or rearward, to a rail plate 12C formed on the rear end of the mounting plate 12. The hook 15 has, in a side view, an approximately C-shaped interlocking structure, which protrudes from a position over a portion coupled with the mounting plate 12, in a form in which an opening of the hook 15 is oriented rearward. As illustrated in FIGS. 2 to 5, having the approximately C-shaped interlocking structure which is open rearward, the hook 15 is fitted over the front pipe 5C from in the radial direction. In this regard, the interlocking structure is elastically fitted over an outer circumferential surface of the front pipe 5C, whereby the hook 15 is slidable in a rotational direction relative to the front pipe 5C. Due to the coupling structure in which the hook 15 is rotatably coupled to the front pipe 5C, a rear pivot-mounting part 10B capable of rotatably pivot-mounting the air conditioner 10 to the front pipe 5C is embodied.

In detail, the hook 15 having the C-shaped coupling structure is fitted over the outer circumferential surface of the front pipe 5C in a shape in which the hook 15 encloses more than half the circumference of the front pipe 5C in an approximately concentric arc shape. Due to the foregoing coupling, the air conditioner 10 can absorb, through sliding-rotation of the hook 15 relative to the front pipe 5C, movement in which the angle at which the air conditioner 10 is bridged between the front panel 3Fb and the front pipe 5C is changed by upward or downward movement of the front panel 3Fb. As illustrated in FIG. 6, sliding protrusions 15A extending in a stripe shape in the lateral direction of the seat are provided on an inner circumferential surface of the C-shaped coupling structure of the hook 15 at three circumferential positions, including positions adjacent to opposite ends of the C-shaped coupling structure and a position therebetween.

Figure 5:
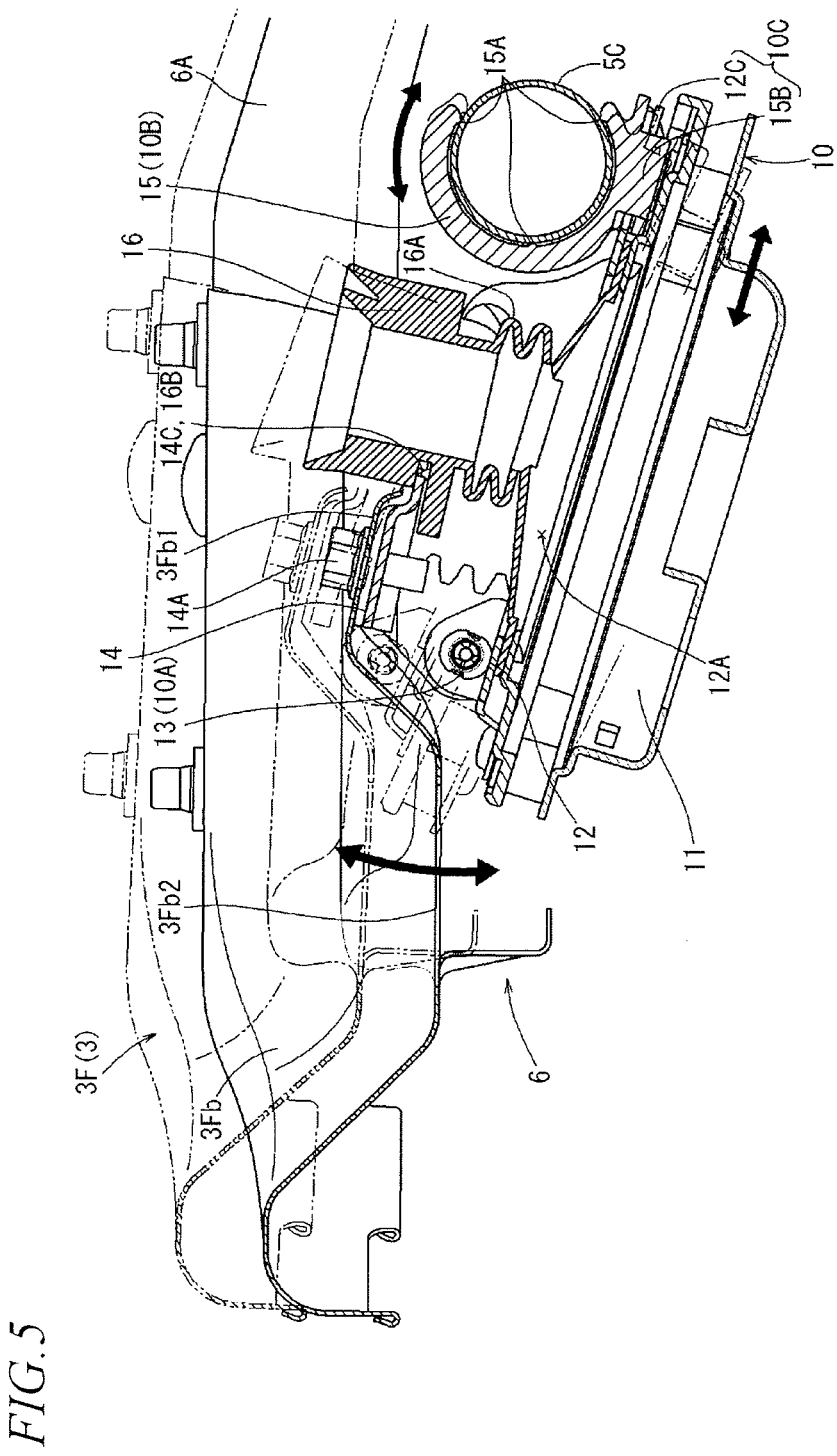
FIG. 5 is a schematic view illustrating an enlargement of a critical portion of FIGS. 3 and 4.
Figure 9:
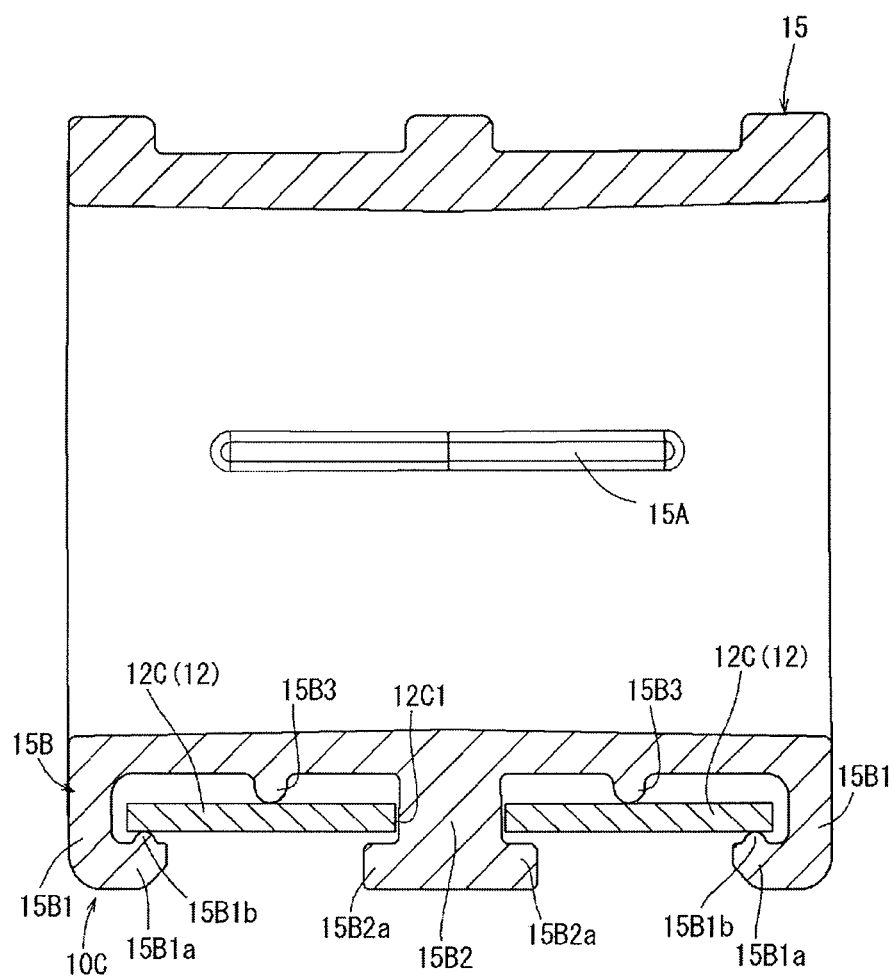
FIG. 9 is a sectional view taken along line IX-IX of FIG. 6.

As illustrated in FIG. 5, the sliding protrusions 15A form a point contact structure in which, when the hook 15 is fitted over the outer circumferential surface of the front pipe 5C, the sliding protrusions 15A come into contact with the outer circumferential surface of the front pipe 5C at three points with respect to the circumferential direction. Due to the sliding protrusions 15A the contact area on the sliding-rotation of the hook 15 relative to the front pipe 5C is reduced, whereby the sliding-rotation of the hook 15 can be smoothly performed. As illustrated in FIGS. 6 and 9, each sliding protrusion 15A is formed on the inner circumferential surface of the approximately C-shaped coupling structure of the hook 15 at a central portion other than opposite side portions in the lateral direction of the seat.

As illustrated ill FIGS. 7 and 8, the hook 15 includes a slide connection part 15B formed in a lower end thereof. The rail plate 12C provided on the rear end of the mounting plate 12 is inserted into the slide connection part 15B so that the hook 15 is mounted to the rail plate 12C so as to be slidable forward or rearward. In detail, as illustrated in FIGS. 8 and 9, the slide connection part 15B includes stop pieces 15B1, a guide 15B2, and stripe-shaped protrusions 15B3. The stop pieces 15B1 protrude downward from respective opposite ends of the lower surface of the hook 15 and extend in the front-rear direction. The guide 15B2 protrudes from the lower surface of the hook 15 at a central position with respect to the lateral direction of the seat and extends in the front-rear direction. The stripe-shaped protrusions 15B3 extend in the front-rear direction and protrude a relatively low height downward from the lower surface of the hook 15 at respective regions defined between the respective stop pieces 15B1 and the guide 15B2.

Each of the stop pieces 15B1 and the guide 15B2 extends downward from the lower surface of the hook 15 to a distal end thereof with the same width, and extends in the front-rear direction with a constant cross-section. The stop pieces 15B1 and the guide 15B2 extend the same height downward.

In detail, the stop pieces 15B1 are provided with respective claws 15B1a which protrude, in a sun visor shape, from the respective distal lower ends of the stop pieces 15B1 in the seat lateral direction facing each other toward the inside of the hook 15. The stop pieces 15B1 receive, between inner surfaces thereof and from front ends thereof, the rail plate 12C of the mounting plate 12. Thus, the stop pieces 15B1 are mounted to the rail plate 12C in such a way that opposite edges of the rail plate 12C come into contact with the respective inner surfaces of the stop pieces 15B1 and, simultaneously, the claws 15B1a support the lower surface of the rail plate 12C.

The stop pieces 15B1 are formed such that a lateral width therebetween is slightly greater than a lateral width of the rail plate 12C, and the opposite edges of the rail plate 12C with respect to the lateral direction of the seat come into contact with the stop pieces 15B1 with a slight gap formed therebetween. The claw 15B1a of each stop piece 15B1 is provided with a sliding protrusion 15B1b which protrudes from an upper surface of the claw 15B1a and extends in a line shape in the front-rear direction. The sliding protrusions 15B1b come into contact with the lower surface of the rail plate 12C and thus support upward the rail plate 12C at two opposite points with respect to the lateral direction of the seat.

The guide 15B2 has a lateral width greater than that of each stop piece 15B1 and thus has a high structural strength.

When the rail plate 12C of the mounting plate 12 is inserted between the inner surfaces of the stop pieces 15B1, the guide 15B2 is inserted into a slot 12C1 (refer to FIG. 8), which is formed in a central portion of the rail plate 12C with respect to the lateral direction of the seat and is open rearward. Furthermore, the guide 15B2 is mounted in the slot 12C1 with almost no gap therebetween. Due to this structure, the guide 15B2 can be mounted in the rail plate 12C without moving in the lateral direction of the seat.

An extension protrusion 15B2a protrudes from a lower end of the guide 15B2 toward opposite sides in the lateral direction of the seat and comes into contact with the lower surface of the rail plate 12C. In detail, the extension protrusion 15B2a comes into contact with the lower surface of the rail plate 12C with a slight gap therebetween with respect to the height direction. The extension protrusion 15B2a functions as a stopper configured such that, when a large load by which the hook 15 and the mounting plate 12 may be separated from each other is applied therebetween in the height direction, the extension protrusion 15B2a supports the lower surface of the rail plate 12C to prevent the hook 15 from being separated from the mounting plate 12.

Furthermore, when the rail plate 12C of the mounting plate 12 is inserted between the inner surfaces of the stop pieces 15B1, the stripe-shaped protrusions 15B3 come into contact with the upper surface of the rail plate 12C. In this way, the stripe-shaped protrusions 15B3 support the upper surface of the rail plate 12C while the respective claws 15B1a of the stop pieces 15B1 support the upper surface of the rail plate 12C. Hence, the rail plate 12C can be supported from the opposite sides in the height direction by the slide connection part 15B and thus maintained without undesirably moving in the height direction.

As illustrated in FIG. 8, the rail plate 12C has a plate shape and extends rearward from the rear end of the central portion of the mounting plate 12 with respect to the lateral direction of the seat. The slot 12C1 is formed in the central portion of the rear piece 12C with respect to the lateral direction of the seat so that the rail plate 12C is divided into two parts in the lateral direction of the seat. As described above, the slot 12C1 functions as a passing hole, into which the guide 15B2 of the slide connection part 15B of the hook 15 is inserted from the rear end of the rail plate 12. Stoppers 12C2 protrude from the opposite outer edges of the rear end of the rail plate 12C outward in the lateral direction of the seat.

The stoppers 12C2 protrude outward in the lateral direction of the seat such that the distance between outer ends of the stoppers 12C2 is greater than the lateral width between the inner surfaces of the stop pieces 15B1 of the slide connection part 15B. When the slide connection part 15B is mounted to the rail plate 12C from the rear side thereof, the stoppers 12C2 are elastically pushed inward in the lateral direction of the seat in such a way that the width of the slot 12C1 is reduced, thus allowing the slide connection part 15B to be mounted to the rail plate 12C. When the slide connection part 15B passes over the stoppers 12C2 and are fitted over the rail plate 12C, the stoppers 12C2 are restored to the original positions thereof to have a shape in which the stoppers 12C2 protrude toward the rear ends of the respective stop pieces 15B1, thereby preventing the slide connection part 15B from being removed from the rail plate 12C rearward.

When the rail plate 12C is mounted between the inner surfaces of the stop pieces 15B1 of the slide connection part 15B, the guide 15B2 is inserted into the slot 12C1, whereby the hook 15 is supported by the guide 15B2 such that the hook 15 is prevented from undesirably moving in the lateral direction of the seat. By the above-mentioned mounting of the rail plate 12C, the respective sliding protrusions 15B1b of the claws 15B1a of the stop pieces 15B1 come into contact with two portions of the lower surface of the rail plate 12C and, simultaneously, the stripe-shaped protrusions 15B2 come into contact with two portions of the upper surface of the rail plate 12C. Hence, the hook 15 can also be supported by the sliding protrusions 15B1b and the stripe-shaped protrusions 15B3 such that the hook 15 is prevented from undesirably moving in the height direction. Due to the above-mentioned support structure, the rail plate 12C can prevent the hook 15 not only from moving in the lateral direction of the seat or the height direction but also from tilting in the front-rear direction, the left-right direction or the turning direction.

Due to the above-mentioned support structure, the hook 15 can be mounted to the rail plate 12C so as to be slidable in the longitudinal direction of the slot 12C1 along which the guide 15B2 slides in the front-rear direction. Because the hook 15 is configured to make partial contact with the rail plate 12C through the guide 15B2, the sliding protrusions 15B1b and the stripe-shaped protrusions 15B3, the hook 15 can smoothly slide in the front-rear direction relative to the rail plate 12C with a relatively small contact area therebetween while being maintained in a stable state without undesirably moving in each direction relative to the rail plate 12C.

As such, the hook 15 is mounted to the mounting plate 12 so as to be slidable in the front-rear direction relative to the mounting plate 12. Therefore, when the front panel 3Fb described with reference to FIGS. 3 to 5 is moved upward or downward relative to the front pipe 5C by the operation of the front tilt mechanism 6, variation in distance between the front panel 3Fb and the front pipe 5C can be absorbed by the forward or rearward sliding movement of the hook 15 relative to the mounting plate 12. Due to the configuration in which the hook 15 is mounted to the rail plate 12C of the mounting plate 12 so as to be slidable in the front-rear direction, a slide mechanism 10C capable of changing the distance between the front pivot-mounting part 10A and the rear pivot-mounting part 10B by the slide movement can be embodied.

As illustrated in FIGS. 3 to 7, the duct 16 is configured such that one end thereof that is a lower end based on the drawings is connected to the air inlet port formed in the upper surface of the ventilator 11, and the other end thereof that is an upper end based on the drawings is coupled to a connector for an air distribution hole formed in the lower surface of the cushion pad (not illustrated). The passage body of the duct 16 is made of rubber, and the narrowed part 16B formed in the medial portion of the passage body is fitted into the retaining part 14C formed on the mounting bracket 14. Therefore, the duct 16 can be fixed to the mounting bracket 14 such that an upper part of the duct 16 that is disposed over the narrowed part 16B can be integrally moved with the mounting bracket 14.

In the duct 16, a lower part of the passage body that is disposed under the narrowed part 16B includes a bellows part 16A allowing the passage body to easily bend in forward, rearward, leftward and rightward directions. As illustrated in FIGS. 3 to 5, thanks to the bellows part 16A of the duct 16, a portion of the passage body between the narrowed part 16B coupled to the mounting bracket 14 and the lower end of the passage body coupled to the air inlet port of the ventilator 11 can have a bendable structure allowing the rotation of the mounting bracket 14 relative to the mounting plate 12 that accompanies the operation of the front tilt mechanism 6. Due to the connection of the duct 16, the air conditioner 10 transmits suction force exerted from the ventilator 11 to the connector for the air distribution hole of the cushion pad (not illustrated), whereby air is sucked from vent holes formed in the seating surface of the cushion pad through several portions of the air distribution hole, thus ventilating the surface of the seat cushion 3, thereby preventing stagnation of sweat on the occupant who is sitting on the seat cushion 3.

The air conditioner 10 having the above-mentioned configuration is bridged between the front panel 3Fb and the front pipe 5C in such a way that the mounting bracket 14 is integrally coupled to the lower surface of the front panel 3Fb, and the hook 15 is rotatably fitted over the outer circumferential surface of the front pipe 5C. Due to the foregoing coupling structure, the mounting bracket 14 of the air conditioner 10 is reliably integrally coupled to the front panel 3Fb. Furthermore, the hook 15 of the air conditioner 10 is fitted over the outer circumferential surface of the front pipe 5C in a shape in which the hook 15 encloses more than half the circumference of the front pipe 5C in an approximately concentric arc shape. Thus, the hook 15 can be reliably mounted to the front pipe 5C without being undesirably removed from the front pipe 5C in the radial direction.

Thanks to the foregoing mounting structure of the air conditioner 10, in response to the upward or downward movement of the front panel 3Fb by the operation of the front tilt mechanism 6, the mounting bracket 14 rotates around the shaft pins 13 relative to the mounting plate 12, or the hook 15 rotates relative to the front pipe 5C, thus allowing the movement of the air conditioner 10 by which the angle at which the air conditioner 10 spans between the front panel 3Fb and the front pipe 5C is changed. In response to the upward or downward movement of the front panel 3Fb by the operation of the front tilt mechanism 6, the hook 15 slides forward or rearward relative to the mounting plate 12, thus allowing the movement of the air conditioner 10 by which the distance that the air conditioner 10 spans between the front panel 3Fb and the front pipe 5C is changed.

As such, even when the position of the front panel 3Fb is changed by the operation of the front tilt mechanism 6, the air conditioner 10 can be maintained in a state in which it is reliably coupled to the front panel 3Fb and the front pipe 5C. Therefore, even if a load is applied downward to the hook 15 coupled to the front pipe 5C, the hook 15 can be maintained in a state in which it is reliably coupled to the front pipe 5C, whereby the hook 15 can be prevented from being removed from the front pipe 5C. Furthermore, the air conditioner 10 that is relatively heavy can be reliably supported between the front panel 3Fb and the front pipe 5C without being removed therefrom.

In detail, in the air conditioner 10, the coupling structure between the hook 15 and the mounting plate 12 that allows, using the forward or rearward sliding movement, the tilt-up operation or the tilt-down operation is embodied such that the hook 15 is prevented from being unstably moved relative to the mounting plate 12 in the height direction or the lateral direction of the seat. Thus, the air conditioner 10 can have high structural strength making it difficult for a bending force, which may be generated by formation of a gap between the elements, to be applied thereto. In addition, the coupling structure between the hook 15 and the mounting plate 12 is embodied such that the hook 15 is prevented from tilting or turning relative to the mounting plate 12 in the front-rear direction or the left-right direction. Thus, the forward or rearward sliding movement can be smoothly performed without being stuck or applying an undesirable load to other parts.

As described in detail n the above, the seat 1 according to the embodiment has the following configuration. The seat 1 includes the front tile unit 6 which can adjust the angle of the seating surface of the front portion of the seat cushion 3, and the air conditioner 10 which is coupled to the seat cushion 3. The front tilt mechanism 6 is configured such that the front panel 3Fb bridged between the opposite side frames 3Fa of the seat cushion 3 rotates in the height direction around the rotating shafts 6B that function as connection points between the front panel 3Fb and the opposite side frames 3Fa, whereby the angle of the seating surface of the front portion of the seat cushion 3 is adjusted.

The air conditioner 10 includes the front pivot-mounting part 10A which is pivotally mounted to the lower surface of the front panel 3Fb, the rear pivot-mounting part 10B which is pivotally mounted to the front pipe (cylindrical pipe) 5C bridged between the opposite side frames 3Fa, and the slide mechanism 10C capable of varying the distance between the front pivot-mounting part 10A and the rear pivot-mounting part 10B in a sliding manner. The air conditioner 10 is bridged between the lower surface of the front panel 3Fb and the front pipe 5C in such a way that the operation of the front tilt mechanism 6 is allowed by the sliding movement of the slide mechanism 10C.

Due to the above-mentioned configuration, even when the distance between the front panel 3Fb and the front pipe 5C is changed by the operation of the front tilt mechanism 6, the air conditioner 10 can be maintained in the state in which it is bridged between the front panel 3Fb and the front pipe 5C, by the sliding movement of the slide mechanism 10C without a change in the pivot mounting structure capable of rotating the air conditioner 10 relative to the front panel 3Fb and the front pipe 5C. Therefore, the movement of the air conditioner 10 can appropriately follow the operation of the front tilt mechanism 6.

In the slide mechanism 10C, the slide connection part 15B of the hook 15 (the first side member that is slidably assembled to the second side member) is locked to the rail plate 12C of the mounting plate 12 (the second side member) on opposite side portions with respect to the lateral direction of the seat so that the hook 15 is prevented from being removed therefrom in the height direction. In addition, the slide mechanism 10C has a configuration in which the slide connection part 15B is assembled to the mounting plate 12 in a state of being narrowed in the lateral direction of the seat by the guide 15B2 having a width thicker than that of both ends of the slide connection part 15B at the central portion in the lateral direction of the seat.

Due to the foregoing configuration, the configuration of the slide mechanism capable of appropriately restricting tilting movement between the hook 15 and the rail plate 12C that slide relative to each other can be realized with a compact structure with respect to the lateral direction of the seat and a high structural strength.

Furthermore, the slide connection part 15B is configured to make partial contact with the rail plate 12C (the second side member) using the stripe-shaped protrusions 15B3 which extend in a stripe shape and protrude in the height direction toward the rail plate 12C at positions spaced apart from each other with respect to the lateral direction of the seat. Due to this configuration, the resistance in sliding the hook 15 relative to the rail plate 12C is reduced, whereby the sliding movement can be smoothly performed.

Furthermore, the rear pivot-mounting part 10B is formed of the C-shaped hook 15 which is fitted over the outer circumferential surface of the front pipe 5C. The sliding protrusions 15A are provided on the inner circumferential surface of the hook 15 to make partial contact with the front pipe 5C. Due to this configuration, the resistance in sliding the rear pivot-mounting part 10B relative to the front pipe 5C is reduced, whereby the rotation thereof can be smoothly performed.

Although the example according to the embodiment has been illustrated and described, various other examples may be derived from the teachings of the present disclosure. For example, the "vehicle seat" according to the present disclosure may not only be applied to seats other than a passenger seat of an automobile but may also be applied to seats for other vehicles such as a train, an aircraft, a ship, etc.

In addition, the cylindrical pipe to which the rear pivot-mounting part of the air conditioner is mounted may be integrally provided between the opposite side frames or, alternatively, may be provided to be rotated when the seat lifter or the front tilt mechanism is operated. The rear pivot-mounting part may be pivotally mounted to the cylindrical pipe by a coupling method in which the cylindrical pipe axially passes through the rear pivot-mounting part, rather than by a coupling method in which the rear pivot-mounting part is fitted over the outer circumferential surface of the cylindrical pipe. Further, the front pivot-mounting part may be configured such that a bracket is coupled to the lower surface of the front panel and then the front pivot-mounting part is pivotally mounted to the bracket or is tiltably coupled thereto.

The slide mechanism for the air conditioner may not be a structure of sliding straightly in the front-rear direction. For instance, the slide mechanism may be a structure of sliding straightly in a direction inclined with respect to the height direction or a structure of sliding along a curved path. In the slide mechanism, the first side member having a slidable structure is locked to the second side member on opposite lateral side portions thereof so as to prevent the first side member from being removed from the second side member in the height direction. The slide mechanism is configured such that, at the lateral center, a gap with respect to the lateral direction is filled by the guide having a thickness greater than that of the opposite side portions. Thereby, the configuration of the slide mechanism capable of appropriately restricting tilting movement between the first and second side members that slide relative to each other can be realized with a compact structure with respect to the lateral direction and a high structural strength.

Furthermore, the slide mechanism is configured to make partial contact between the first and second side members with respect to the height direction using the stripe-shaped protrusions which extend in the slide direction and protrude in the height direction from lateral partial portions of either the first or second side members toward the other side member. Thus, the resistance in sliding between the first and second side members is reduced, whereby the sliding movement can be smoothly performed.

Alternatively, the slide mechanism may be configured such that the first side member having a slidable structure is locked to the second side member at the lateral center portion so as to prevent the first side member from being removed from the second side member in the height direction, and a gap with respect to the lateral direction is filled by guides, which are provided on opposite lateral side portions and each of which has a thickness greater than that of the central portion.

What is claimed is:

1. A vehicle seat comprising:
   a front tilt mechanism that includes a front panel that is bridged between left and right side frames of a seat cushion and connected with the left and right side frames at connection points, the front panel being configured to pivot about the connection points in a height direction to adjust an angle of a seating surface of a front portion of the seat cushion; and
   an air conditioner that is mounted to the seat cushion, the air conditioner including:
      a front pivot-mounting part that is pivotally mounted to a lower surface of the front panel;
      a rear pivot-mounting part that is pivotally mounted to a cylindrical pipe that is bridged between the left and right side frames; and
      a slide mechanism that allows to change a distance between the front pivot-mounting part and the rear pivot-mounting part with a slide movement,
   wherein the air conditioner is bridged between the lower surface of the front panel and the cylindrical pipe and configured to allow the front panel of the front tilt mechanism to pivot about the connection points with the slide movement of the slide mechanism.

2. The vehicle seat according to claim 1,
   wherein the slide mechanism includes a first side member and a second side member that are assembled to be slidable relative to each other, and is configured such that the first side member is locked to the second side member at both ends so as to prevent the first side member from being removed from the second side member in the height direction, and that the first side member is assembled to the second side member in a state of being narrowed in a lateral direction of the seat by a guide having a width thicker than that of the both ends at a central portion in the lateral direction.

3. The vehicle seat according to claim 2,
   wherein the first side member of the slide mechanism is configured to be in partial contact with the second side member with respect to the height direction with a stripe-shaped protrusion that extends in a slide direction and protrudes in the height direction from a lateral partial portion of either the first side member or the second side member toward the other side member.

4. The vehicle seat according to claim 1,
   wherein the rear pivot-mounting part includes a C-shaped hook fitted over an outer circumferential surface of the cylindrical pipe, with a sliding protrusion provided on an inner circumferential surface of the hook, the sliding protrusion being in partial contact with the cylindrical pipe.

* * * * *